Aug. 21, 1945.     D. A. MEEKER ET AL     2,383,404
SCALE
Original Filed Oct. 15, 1941     2 Sheets-Sheet 1
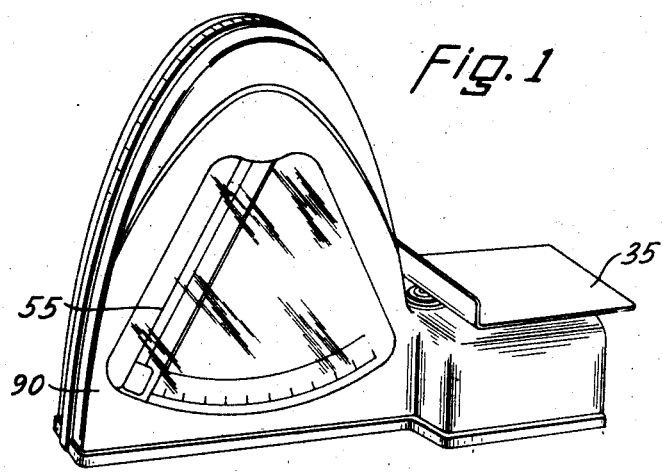
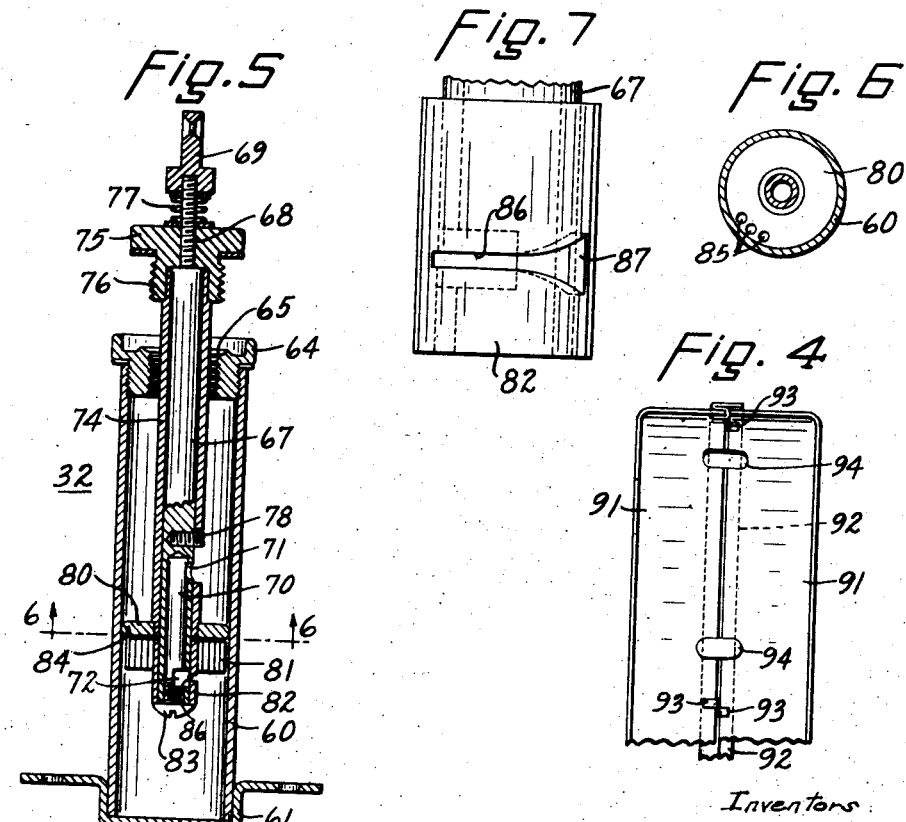
Inventors
Kenneth C. Allen, and
David A. Meeker
Marechal and Noe
Attorneys.

Aug. 21, 1945.        D. A. MEEKER ET AL        2,383,404
SCALE
Original Filed Oct. 15, 1941    2 Sheets-Sheet 2
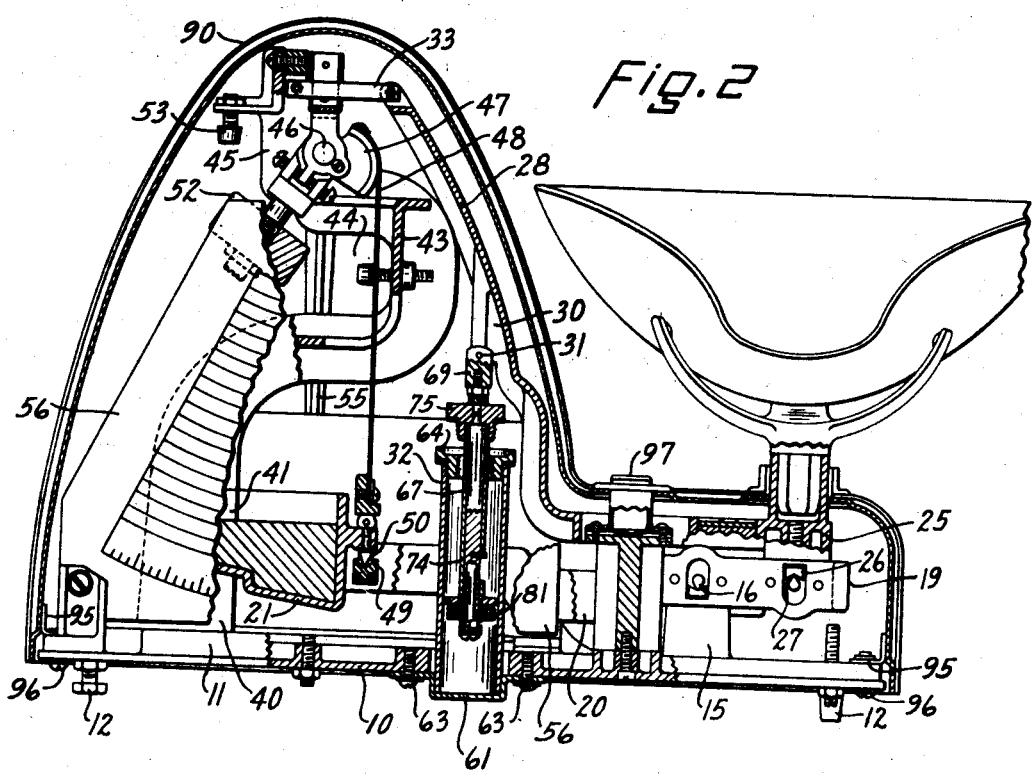
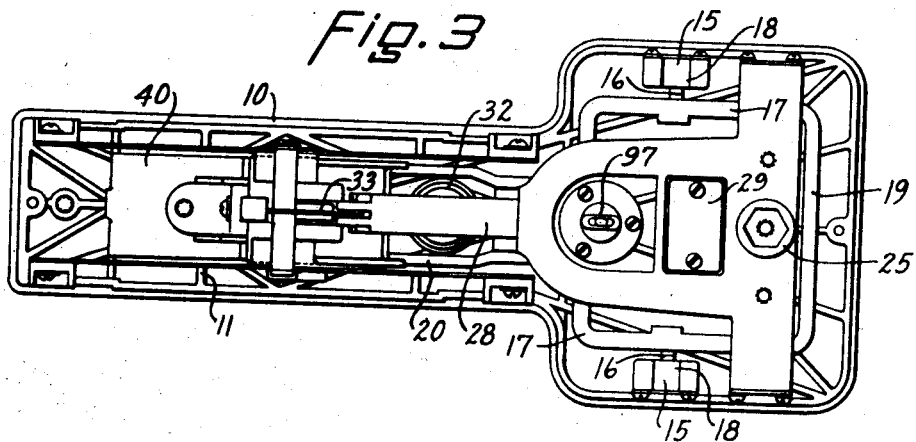
Inventors
Kenneth C. Allen and
David A. Meeker.
Maréchal and Noe.
Attorneys.

Patented Aug. 21, 1945

2,383,404

UNITED STATES PATENT OFFICE 2,383,404

SCALE

David A. Meeker, Troy, and Kenneth C. Allen, Dayton, Ohio, assignors to The Hobart Manufacturing Company, Troy, Ohio, a corporation of Ohio Original application October 15, 1941, Serial No. 415,108. Divided and this application June 29, 1942, Serial No. 448,965

6 Claims. (Cl. 265—61)

This invention relates to scales.

It is the principal object of the invention to provide a fan-type scale which is simple and inexpensive in manufacture, which is low and compact and requires a minimum counter space and which affords reduced obstruction of vision as between the clerk and the customer.

It is a further object to provide such a scale which weighs quickly and accurately under widely varying room temperature conditions.

It is a further object to provide such a scale in which the scale is assembled upon the base and sealed, following which a unitary outer housing is positioned over the scale mechanism entirely enclosing the same and preventing any access to the interior thereof.

It is a still further object to provide a fluid dashpot for use in such a scale, the dashpot being compensated in predetermined manner corresponding to the temperature characteristics of the fluid used so that the action of the dashpot in the damping of the oscillations of the scale is substantially uniform under widely varying room temperature conditions.

It is a still further object to provide such a scale construction in which the platter support is located laterally of the scale mechanism and in such position that the platter may overhang the fan chart, to produce a compact arrangement and one affording a minimum of obstruction of vision.

Other objects and advantages will be apparent from the following description, the accompanying drawings, and the appended claims.

In the drawings,

Fig. 1 is a view in perspective of a scale constructed in accordance with this invention as seen from the clerk's side thereof;

Fig. 2 is a vertical sectional view with certain parts being broken away showing the arrangement of the housing and of the interior mechanism of the scale, and with a different type of platter;

Fig. 3 is a plan view of the scale with the housing and the platter removed therefrom;

Fig. 4 is a broken detailed view showing the manner in which the housing is assembled to provide a unitary structure.

Fig. 5 is a vertical sectional view on an enlarged scale through the dashpot mechanism;

Fig. 6 is a detail sectional view on the line 6—6 of Fig. 5; and

Fig. 7 is an elevational view on a further enlarged scale showing the dashpot valve and the shape and contour of the opening provided therein.

This application is a division of parent Patent No. 2,347,803, issued May 2, 1944, assigned to the same assignee as this application.

In the present invention a fan-type scale is provided which is simple and compact and which makes use of only a minimum of valuable counter space. While not limited in its application, it is adapted for use as a candy scale, and as such it is desirable that it be small in size, and that it afford a minimum of visual obstruction across the counter.

In the present invention an inverted fan chart is provided together with a cooperating index pointer the center of the pointer being located above and substantially centrally of the main body of the chart. The platter support is located laterally of the chart at a relatively low position and with the platter, in case the customary scoop is utilized, standing in such position that it in part overlies the adjacent side of the chart, but with the body of the platter being located preferably within the vertical limits of the fan chart. Such arrangement affords a compact construction, being economical of counter space and introducing a minimum obstruction at such an elevation as to interfere with the vision between the clerk and the customer.

The scale structure is completely assembled on a base and is adjusted and sealed in that condition, such adjustment at the factory including the setting of the dashpot to afford the proper degree of resistance to damp out the oscillations of the scale. Thereafter a decorative housing is telescoped over the scale mechanism and fastened in close fitting relation upon the base. With such housing in place, all access to the scale mechanism is prevented, and it thus becomes impossible to make any change in the proper weighing characteristics of the scale without again removing the housing therefrom, and for this reason accidental or intentional errors in weight are effectively eliminated.

With such enclosed construction, it is found that changes in the ambient temperature conditions greatly affect the operation of the dashpot. The fluid utilized is usually of an oil nature and is one which does not readily volatilize. While the viscosity characteristics of some fluids vary more widely with temperature changes than others, it has been found that even with the best fluids obtainable, i. e., those having the "flattest" viscosity-temperature curves, there is still a very substantial change in the viscosity characteristics over the range of temperature conditions to which the scale may be subjected. For example, in some cases a store room not heated at night may drop to a temperature as low as 40° F., and on the other hand, in certain areas the summer temperature may rise as high as 110° to 120° F. Under this range of room temperatures the scale will not function to give the desired operating characteristics unless proper compensation is afforded.

It is further a characteristic of those materials suitable for use as the hydraulic fluid that whereas their viscosity varies in substantially a uniform or linear manner at the higher end of such temperature range, the viscosity increases much more rapidly at the lower end of the range. Thus a compensation which provides merely a change in resistance proportional ot the temperature change can at best be but an approximation, and cannot provide an accurate control of the operating characteristics to maintain uniform conditions.

The present invention therefore provides a compensating valve in the dashpot construction, such valve having both a linear and a non-linear temperature compensating characteristic. That is to say, the valve aperture is predetermined with reference to the variation in the viscosity characteristics of the fluid used, so that the aperture is increased at a relatively slow and substantially uniform rate as the temperature drops from the high range to the intermediate range. And as the temperature drops further toward the cold end of the range, the aperture is enlarged at a progressively increasing rate. The combined result attained by such arrangement is to make the operation of the dash pot substantially uniform over the entire range, and thus a completely enclosed scale equipped with such a dashpot will weigh both accurately and quickly at substantially any point within the range of temperatures from the lowest to the highest conditions normally encountered for room temperature.

Referring to the drawings which disclose a preferred embodiment of the invention, the scale mechanism is entirely supported upon a main base frame 10 which is preferably formed as an integral cast piece suitably webbed as shown at 11 to afford the proper strength while reducing the weight thereof. The base is supported by feet 12, two such feet being fixed and the third being threaded into the base to provide for supporting and adjusting the base to a level condition above its support. Fulcrum supports 15 are likewise preferably formed integrally with the base casting and are located in relatively widely spaced relation as shown. They form supports for V bearings which in turn support knife edge pivots 16 carried by the lever 17 which is of the first order. Bearing caps 18 are provided as usual to avoid the lifting of the pivots from the bearing supports and to take the side thrust of pivots thus centering the lever in the scale.

Lever 17 is integrally joined at one end as shown at 19, and on the opposite of pivots 16 extends laterally to form a portion of reduced width 20 terminating in the integrally formed weighted cup 21. As shown, the section 20 of the lever and cup 21 is of substantially less width than the portion 19 of lever 17, thereby providing a relatively narrow construction in the chart portion of the scale.

A platter support 25 is pivotally supported on lever 17 by means of bearing 26 and knife edge 27 carried by the lever, the platter support being formed as an integral casting with a laterally and upwardly extending arm portion 28. Likewise a shot cup 29 may be formed integrally to receive the shot which are used to balance the scale.

The upwardly extending arm 28 is provided with a pair of spaced parallel webs 30 which are bored to receive a cross pin 31 which provides a connection for the dashpot, indicated generally at 32. Arm 28 extends upwardly and at its upper end is pivotally connected to a check link 33 which maintains parallel movement of the platter support in a vertical plane throughout the movement of the lever.

The platter 35 may be in the form of a flat plate as shown in Fig. 1, adapted to be received within a non-circular opening in the platter support, or may comprise a three point bracket for supporting the customary scoop as shown in Fig. 3.

To support the indicating and weighting mechanism a bracket 40 is fastened at its lower end to the base casting 10 and is recessed as shown at 41 to receive the forwardly projecting end of the counterweight 21, the bracket being preferably webbed to afford a maximum strength with the least weight of material. The bracket extends upwardly and is then formed with an offset portion 43 to provide a recess or space 44 within which to receive a pendulum weight. The bracket continues upwardly with an overhanging portion 45, to which the check link 33 is suitably connected by a pivotal connection, through a vertically adjustable pivot support.

The bracket likewise forms a support for cross shaft 46, to which is eccentrically attached a constant radius sector 47 provided with a flexible tape 48 extending down to a stirrup 49 having bearing engagement with a conical shaped member 50 carried by counterweighted end of the lever. A pendulum 52 is likewise mounted on cross shaft 46, and the weight of counterweight 21 is such that it normally balances the weight of the pendulum and retains the pendulum in its upper position. As weight is applied to the platter, the effect of the counterweight is partially overcome, and as it rises, the pendulum descends, the pendulum thus descending with increase of weight on the platter. Suitable bumpers 53 of rubber or like material are provided for arresting the movement of the pendulum at either end of its swing.

Shaft 46 likewise carries a pointer or index arm 55 which is thus rotated about the axis of shaft 46. Fan chart 56 is located below the axis of shaft 46, and substantially symmetrically with respect thereto, being thus generally in inverted position. Preferably a pair of index pointers are mounted on shaft 46, one having an index line and being adapted to cooperate with the computing fan chart at the clerk's side of the scale mechanism, and the other comprising merely a pointer cooperating with a weight designation chart on the customer's side of the scale. Thus movements of the pendulum and counterweight in response to the load on the platter result in corresponding movements of the two pointers over the respective charts.

The dashpot 32 comprises a cylinder 60 suitably welded to a supporting bracket 61 and inserted upwardly through an aperture in the base frame 10, and bolted in place thereon by bolts 63. The upper end of cylinder 60 is closed by a cap 64 threaded thereinto and in turn having internal threads 65 to receive the valve stem in the inoperative condition of the scale, such as when it is being shipped or the like.

The valve assembly comprises a central stem

67 formed with a pin 68 at its upper end to which is attached a connecting hub 69 provided with an aperture thereto for being received over pin 31. Thus when the scale is assembled, the hub 69 is attached to the arm 28 in such manner as to cause raising and lowering of the stem in response to the movements of the platter support.

The lower part of the stem is bored as shown at 70 with a deep axial bore, and an aperture 71 is formed radially through the stem to communicate with the bore 70 toward the upper end thereof. Likewise a portion of the stem is cut out as indicated at 72, in communication with the bore 70 adjacent the lower end thereof, thereby providing a passage of relative large size for the flow of fluid.

A sleeve 74 is received over the stem 67 and an adjusting nut 75 is fastened to the upper end of the sleeve, in such position that the sleeve is held against axial movement upon the stem but not against angular movement with respect thereto. The nut 75 has a threaded portion 76 adapted to be received within the internally threaded portion 65 for closing and sealing the dashpot during shipment. Also a compression spring and washer assembly 77 is provided between the hub 69 and nut 75 to yieldingly retain the nut against accidental movement in any position of relative angular adjustment between the two. Radially extending pin 78 carried by stem 67 cooperates with a cut-away portion of the sleeve to limit the extent of relative movement of such parts, such cut-away portion being large enough to allow free passage of the fluid through aperture 70 in all positions of the sleeve.

Sleeve 74 likewise carries a plunger 80 which closely approaches the wall cylinder 60 and thus substantially prevents flow of fluid from one side of the plunger around to the other. A spirally coiled bimetallic element 81 is carried below plunger 80, the inner end of such spring being fastened to a separate sleeve member 82 received over stem 67. Bolt 83 threaded into the end of the bore 70 provides for retaining sleeve 82 in place, while permitting removal thereof for the purpose of adjustment, cleaning, or the like. The outer end of spring 81 is formed with a projecting pin 84 which is adapted to be received in one of a series of apertures 85 formed in the lower side of plunger 80, making it possible to adjust the initial position of the bimetallic element to any one of the angular positions established by the cooperation of pin 84 and apertures 85.

Sleeve 82 is formed with a slot 86 which is adapted to be brought into register, to greater or lesser degree, with opening 72 to afford a fluid by-pass from one side of the plunger to the other. The width of the slot at one end is relatively small as indicated at 86, and the slot in this area is of substantially uniform cross-section. Thus as the temperature falls from the higher temperature range in which the scale is adapted to operate, more of the opening is uncovered, and the total integrated opening increases substantially linearly up to the intermediate temperature range.

Continuous with portion 86 of the slot is another portion 87 which is of progressively increasing width. This corresponds to the low end of the temperature range and provides an integrated opening which is non-linear in relation to temperature, so that the normally encountered rapid increase in the viscosity of the fluid is compensated for, and the resistance to the flow of the fluid made substantially uniform throughout the temperature range.

If it is desired to change the extent of the damping, that can be effected by shifting the nut 75 with respect to the hub 69, within the limits permitted by stud 78, such change effecting a relative shifting as between the temperature controlled sleeve 82, and the corresponding opening 72 in the stem thus shifting the extent of the slot 86 which is uncovered at any given temperature. If a change beyond the range afforded by this adjustment is desired, the bolt 83 can be removed and the end of spring 84 positioned in a different aperture 85, thus similarly changing the relation between the slot opening and the temperature.

The scale is preferably completely assembled, sealed, adjusted and inspected without the outer housing being in place. This includes the proper adjustment for the dashpot, at the ambient temperature existing at that time. Thereafter a decorative and enclosing housing 90 is received in telescoping relation over the scale mechanism, such housing being preferably formed of a pair of stamped metal sections 91 with an outer and centrally located trim strip 92 which is fastened in place by means of integrally formed ears 93 extending through the slot between the two housing sections and turned back into overlapping relation thereagainst. The housing sections themselves are fastened together by means of cross strips 94 welded to each section and suitably spaced as required to afford a satisfactory and solid structure. Brackets 95 are welded in place adjacent the lower edge of the housing and are adapted to receive bolts 96 extending upwardly through the base to thus retain the housing in its assembled position upon the scale. The housing as shown is preferably formed to closely overlie the scale mechanism and present a smooth, attractive and easily cleanable outer surface. As will be obvious, suitable apertures are provided in the housing for receiving the platter support and the level indicated at 97. In the normal use of the scale it is not necessary at any time to secure access to the interior and it may thus remain in closed and sealed condition affording quick and accurate readings without the need of securing access to the scale mechanism or of adjusting the dashpot and hence the possibility of disturbing the accuracy of weighing, and of dirt or foreign material getting into the mechanism are avoided.

While the form of apparatus herein described constitutes a preferred embodiment of the invention, it is to be understood that the invention is not limited to this precise form of apparatus, and that changes may be made therein without departing from the scope of the invention which is defined in the appended claims.

What is claimed is:

1. A computing scale of the character described comprising a base, a weighted lever mounted on said base having a wide portion and a narrow portion, a fulcrum for pivotally supporting said lever from the wide part thereof, a platter support pivotally mounted on the wide portion of said lever at one side of said base, a pendulum connected to said lever overbalanced by said lever and arranged to descend as the weight is applied to the platter, an inverted fan chart having its lower part overlapping the narrow portion of said lever, means for supporting said pendulum with its axis of rotation above said chart, an index pointer rotatable with said pendulum about said axis over the face of said chart, and a platter received on said platter support in position adjacent and overlying the lower edge of said chart.

2. A computing scale of the character described comprising a base, a weighted lever mounted on said base, a platter support pivotally mounted on said lever at one side of said base, a pendulum connected to said lever overbalanced by said lever and arranged to descend as the weight is applied to the platter, an inverted fan chart having its lower part extending in overlapping relation with respect to the weighted portion of said lever, means for supporting said pendulum with its axis of rotation above said chart and in position to swing in overlapping relation with the upper part of said chart confining the pendulum to a relatively narrow space adjacent the top of said chart, an index pointer rotatable with said pendulum about said axis over the face of said chart, a unitary housing having an open lower side receivable over said scale and upon said base for enclosing the scale mechanism, said housing having a narrow upwardly extending portion closely enclosing said pendulum and its said supporting means and having a low laterally extending portion at one end thereof enclosing said platter support, and a platter adapted to be received on said platter support at said one end of the scale in closely overlying relation to said housing and within the vertical limits of said chart.

3. A computing scale of the character described comprising a base, a weighted lever mounted on said base, a pendulum connected to said lever, an inverted fan chart having its lower part overlapping said lever and readable upon the outer side thereof, means for supporting said pendulum with its axis of rotation above said chart, an index pointer rotatable with said pendulum about said axis over the face of said chart, a platter support pivotally mounted on said lever and being formed with an arm extending upwardly and laterally therefrom to a position adjacent and above said pendulum axis, a short check link connected to said arm above said axis and extending in compact relation on opposite sides of the axis of said pendulum, and a dashpot connected at an intermediate point to said arm to damp the oscillations of the scale mechanism.

4. A fan scale of the character described comprising a base, a weighted lever mounted on said base, a platter support pivotally mounted on said lever, a pendulum connected to said lever overbalanced by said lever and arranged to descend as the weight is applied to the platter, an inverted fan chart having its lower part overlapping said lever and readable upon the outer side thereof, means for supporting said pendulum with its axis of rotation above said chart, an index pointer rotatable with said pendulum about said axis over the face of said chart, a platter support pivotally mounted on said lever and being formed with an arm extending upwardly and laterally therefrom to a position adjacent the upper part of said chart, a dashpot connected to an intermediate portion of said arm for damping the oscillations thereof and of said lever, and a single housing element having an open lower side receivable over said scale and upon said base completely enclosing and closely confining said scale mechanism and said dashpot.

5. A fan type scale of the character described comprising a base, a weighted lever mounted on said base, an inverted fan chart the lower portion of which closely approaches said base at one side thereof and extends below said lever in overlapping relation therewith, a pendulum, means for supporting said pendulum with its axis of rotation above said chart in compact relation with the upper part of said chart providing weighing mechanism which is relatively narrow at the upper portion thereof, a platter support at the other side of said base adapted to receive and support a platter above said base, a unitary housing having a closed and relatively narrow upper portion and being open on its bottom side and adapted to be received over said chart and lever for entirely enclosing and closely confining the same and having a cross section which does not decrease from the upper portion to the bottom side thereof providing for direct application and removal of said housing, said housing having an opening for receiving said platter support, said housing on the side adjacent said platter extending below said platter and in nested relation therewith.

6. A fan type scale of the character described comprising a base, a weighted lever mounted on said base, an inverted fan chart the lower portion of which closely approaches said base at one side thereof and extends below said lever in overlapping relation therewith, a pendulum, means for supporting said pendulum with its axis of rotation above said chart and in compact relation therewith providing weighing mechanism which is relatively narrow at its upper portion, a platter support at the other side of said base adapted to support a platter above said base, a relatively narrow unitary housing receivable over and enclosing said chart and lever and having an edge portion thereof extending adjacent and in nested relation with respect to said platter and having an opening for receiving said platter support, the housing having a cross section which does not decrease from the upper to the lower side thereof providing for direct application and removal thereof in closely confining relation with respect to said chart and said weighing mechanism.

DAVID A. MEEKER.
KENNETH C. ALLEN.